(12) United States Patent
Pierce et al.

(10) Patent No.: US 9,101,090 B2
(45) Date of Patent: Aug. 11, 2015

(54) WINDROWER AUTOGUIDANCE HYDRAULIC STEERING INTERFACE

(71) Applicant: CNH AMERICA, LLC, New Holland, PA (US)

(72) Inventors: Todd B. Pierce, East Petersburg, PA (US); Philip J. Ehrhart, Narvon, PA (US); Mark D. Layton, Lititz, PA (US); Cecil R. Sudbrack, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 254 days.

(21) Appl. No.: 13/905,528

(22) Filed: May 30, 2013

(65) Prior Publication Data

US 2014/0358354 A1     Dec. 4, 2014

(51) Int. Cl.
| | |
|---|---|
| *A01D 34/00* | (2006.01) |
| *A01D 69/03* | (2006.01) |
| *B62D 11/00* | (2006.01) |
| *A01D 41/127* | (2006.01) |

(52) U.S. Cl.
CPC ............ *A01D 69/03* (2013.01); *A01D 41/1278* (2013.01); *B62D 11/005* (2013.01)

(58) Field of Classification Search
CPC .. B62D 11/001; B62D 11/003; B62D 11/005; B62D 11/02; B62D 11/04; A01B 69/00; B60K 7/0015
See application file for complete search history.

(56) References Cited

U.S. PATENT DOCUMENTS

| | | | |
|---|---|---|---|
| 5,590,730 A | 1/1997 | Chung | |
| 5,923,270 A | 7/1999 | Sampo et al. | |
| 6,062,332 A | 5/2000 | Stephenson et al. | |
| 6,549,837 B2 | 4/2003 | Feucht et al. | |
| 7,207,581 B2* | 4/2007 | Osborne et al. | 280/93.502 |
| 7,721,830 B2* | 5/2010 | Dunn et al. | 180/6.48 |
| 8,925,672 B2* | 1/2015 | Bebernes et al. | 180/403 |
| 2002/0133279 A1 | 9/2002 | Manring | |
| 2006/0064216 A1* | 3/2006 | Palmer | 701/41 |
| 2006/0064222 A1* | 3/2006 | Palmer | 701/50 |
| 2007/0016350 A1* | 1/2007 | Fackler et al. | 701/50 |
| 2007/0017712 A1* | 1/2007 | Dunn | 180/6.48 |
| 2008/0087488 A1 | 4/2008 | Palmer | |
| 2009/0095561 A1* | 4/2009 | Simoni et al. | 180/403 |
| 2009/0242219 A1* | 10/2009 | Dunn et al. | 172/2 |
| 2009/0272551 A1 | 11/2009 | Thompson et al. | 172/284 |
| 2012/0215395 A1* | 8/2012 | Aznavorian et al. | 701/25 |
| 2014/0138165 A1* | 5/2014 | Bebernes et al. | 180/6.3 |
| 2014/0138166 A1* | 5/2014 | Otto et al. | 180/6.48 |

\* cited by examiner

*Primary Examiner* — Thomas G Black
*Assistant Examiner* — Peter D Nolan
(74) *Attorney, Agent, or Firm* — Patrick M. Sheldrake; Seyed V. Sharifi T.

(57) ABSTRACT

An autoguidance interface for a hydraulic steering system for a differential steered self-propelled agricultural windrower, windrower speed and direction controlled by adjustment to a control input shaft to control the output of a pair of tandem-mounted hydraulic drive pumps and provide motive power for the windrower. The control input shaft is rotatable and axially moveable. A hydraulic steering motor is operably connected to the input shaft to effect control input shaft rotation. Rotation of the hydraulic steering motor is selectively managed by a steering control valve attached to a cab-mounted windrower steering wheel or a proportional steering valve managed by the autoguidance system. A selector valve controls the active steering input. An emergency disengagement positions the selector valve to restore manual control by the steering wheel.

6 Claims, 3 Drawing Sheets

WINDROWER AUTOGUIDANCE HYDRAULIC STEERING INTERFACE

CROSS REFERENCE TO RELATED APPLICATIONS

This application is related to U.S. patent application entitled "Control Group Mounting Relative to Controlled Hardware", Ser. No. "13/905,513", filed on May 30, 2013; and U.S. patent application entitled "Windrower Steering System", Ser. No. "13/905,521", filed on May 30, 2013. The above applications are herein incorporated by reference.

BACKGROUND OF THE INVENTION

The present invention relates generally to hydraulically powered differential steered agricultural machines, and more particularly to an autoguidance interface for a hydraulic steering system for such a machine Hydrostatic drive systems are often configured with the drive pump attached directly to the engine without a clutch or other mechanism to stop output flow of the pump while the engine is running. Drive pump displacement (output) and therefore speed in differential-steered machines is controlled by variations in swashplate angle which is adjusted by movement of external pintel arms external to the pumps. On most pumps, pintel arm and thus swashplate rotation from "neutral" to "full speed" occurs over a relatively narrow range on the order of 16-18 degrees. With such a small range of motion, it is important that the assembly controlling the angular position of the pintel arm angles be capable of precise angular control. Precise control of the swashplate angle for hydrostatic ground drive pumps on differential-steered agricultural machines is paramount, especially when operating the machine at higher travel speed such as is necessary for road transport between fields.

One common conventional mechanical mechanism uses an input shaft that may be rotated and moved fore-and-aft along its longitudinal axis. Threaded portions on the input shaft, one right-hand threaded and one left-hand threaded, are engaged by mating threaded followers that are connected to the pintel arms on a pair of pumps connected in tandem alongside the input shaft. Rotation of the input shaft result in the followers moving along the threaded portions, either toward each other or away from each other. The result is that the pintel arms are rotated in opposite directions as the input shaft is rotated resulting in opposing changes in the hydraulic pump output to the drive motors (e.g., one increases speed while the other decreases speed). Rotation of the input shaft is directed by a steering wheel located in the operator cab of the machine. Fore and aft movement of the input shaft does not adjust the relative rotational position of the pintel arms, but instead rotates the pintel arms in the same direction by the same degree and is used to adjust the machine travel speed and select between forward and reverse directional movement.

Autoguidance systems are increasingly being fitted to agricultural machines in the quest for ever-improving efficiency. As autoguidance systems become more prevalent in agricultural machines, windrowers and the like are being fitted with autoguidance systems. Incorporating autoguidance systems into an existing machine typically involves the addition of actuators or other mechanical adapters to allow the autoguidance steering actuators to interface with the manual steering system already existing on the machine. Such additions add complexity and cost and may not provide the reliability of a more integrated approach.

SUMMARY OF THE INVENTION

It would be of great advantage to provide a simplified autoguidance interface for the steering control assembly on a hydrostatic, differential steered agricultural machine. Additional advantages would be realized by an autoguidance system interface that is easily incorporated into the existing steering control system commonly used on current model hydrostatic drive differential-steered machines. Still further advantages would be realized by an autoguidance interface with a steering control assembly on a hydrostatic, differential steered agricultural machine that utilizes the existing steering actuation system on the machine.

In a first embodiment of the present invention comprises a hydrostatic drive differential-steered machine having left- and right-side drive pumps tandem-mounted to an engine, each drive pump having an angularly adjustable swash plate moveable by a pivoting pintel arm and a control linkage for simultaneously moving the pintel arms. The pintel arms are moveable in a range from full forward speed to full reverse speed with an intermediate neutral position to enable forward and reverse travel as well as turning of the machine. The control linkage is configured to move the pintel arms in unison by linear motion of the control linkage and to move the pintel arms in opposition by rotary motion of the control linkage. A first input to the control linkage is by a hydraulic steering motor to rotate the control linkage for steering the machine by adjusting the differential speed of the left and right wheels. A steering control valve connected to a steering wheel manages the input for rotating the hydraulic steering motor. The steering control valve is selected to produce a steering gain (e.g., the turn rate of the steering motor is greater than the turn rate of the steering wheel) allowing the increased precision in the interface between the control linkage and the pintel arms. A second input to the control linkage is a linear actuator, movement of which is managed by a forward-neutral-reverse (FNR) lever accessible to the machine operator, to adjust the speed of the wheels uniformly. The linear actuator is connected at one end to the control linkage and to a bracket connected to the drive pumps at the opposite end so that the linear actuator and the pumps share a common anchorage, namely the resiliently mounted engine and hydraulic pumps, further improving steering precision and sensitivity.

An autoguidance system is provided on the machine. The system compares the position and direction of travel of the machine to a programmed or calculated track and generates signals which may be used by a steering control apparatus to adjust the travel direction of the machine to match the desired track. The autoguidance steering signals are directed to a proportional steering valve that is hydraulically connected to the hydraulic circuit between the manual steering control valve and the steering drive motor by an enabling manifold. The manifold allows either the manual steering control valve or the autoguidance steering valve to provide the directional inputs for the steering drive motor without the need for additional steering actuators or mechanisms on the machine.

In another embodiment, an autoguidance interface for a hydraulic steering system for a differential steered self-propelled agricultural windrower is provided. Windrower speed and direction are controlled by adjustment to a control input shaft to control the output of a pair of tandem-mounted hydraulic drive pumps and provide motive power for the windrower. The control input shaft is rotatable and axially moveable. A hydraulic steering motor is operably connected to the input shaft to effect control input shaft rotation. Rotation of the hydraulic steering motor is selectively managed by a steering control valve attached to a cab-mounted windrower steering wheel or a proportional steering valve managed by the autoguidance system. A selector valve controls the active steering input. An emergency disengagement positions the selector valve to restore manual control by the steering wheel.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
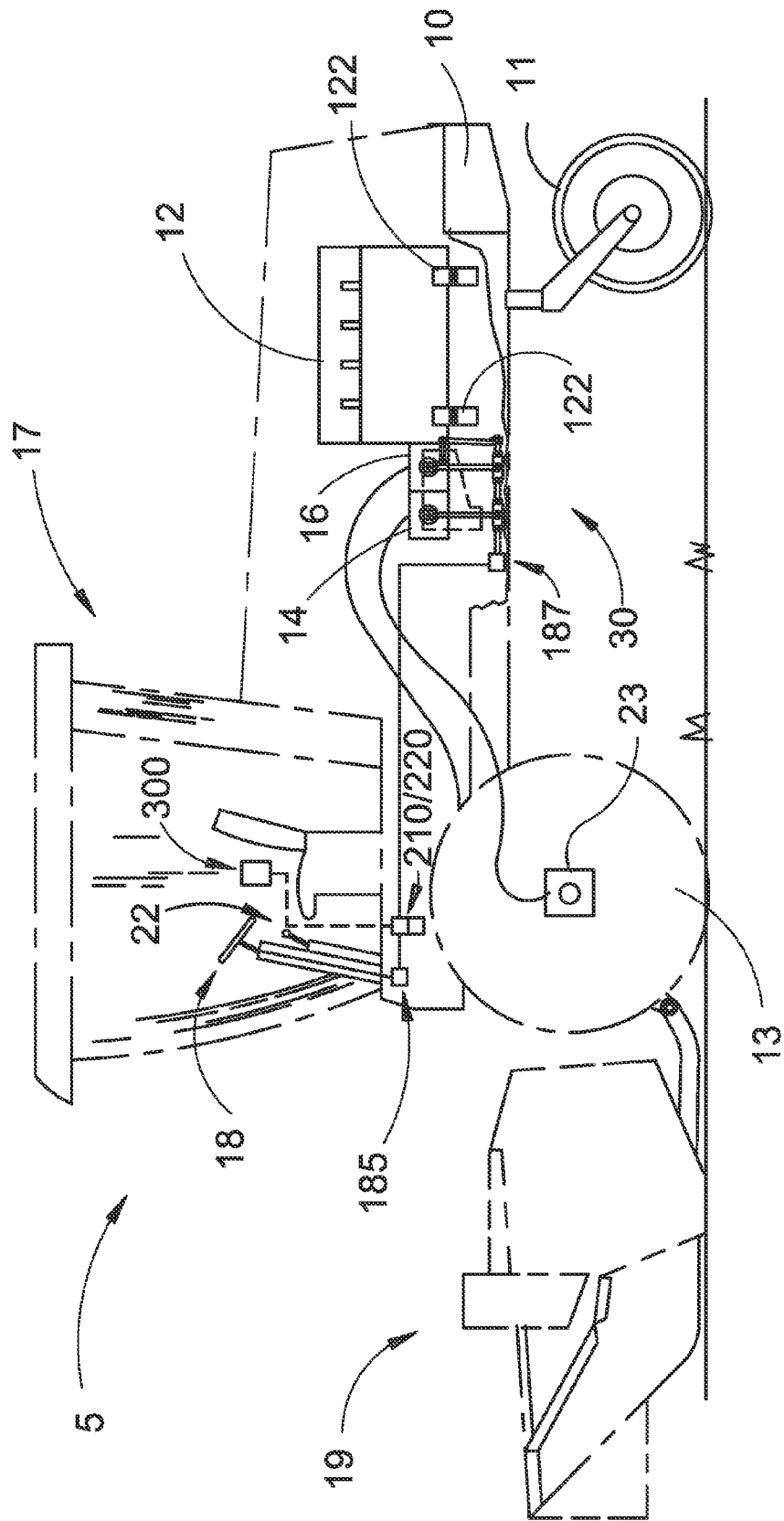
FIG. 1 is a side elevation view of a known differential steered agricultural windrower of the type with which the instant invention finds utility.

FIG. 1 illustrates an agricultural machine 5 of the type on which the present invention finds utility. The machine 5 illustrated is a well-known, self-propelled agricultural windrower employing differential speed of the driving wheels to steer the machine across the ground. The machine comprises a main frame 10 with a longitudinal horizontal axis from front to back, supported by a pair of drive wheels 13 on the front portion thereof and by a pair of steering caster wheels 11 adjacent to the rear end. The main frame 10 supports an operator cab 17 to provide an environmentally controlled location from which the machine may be comfortably operated, and a forwardly disposed header 19. Header 19 may be of several designs, but typically comprises a cutting mechanism, either a sickle bar or rotary cutter, a feeder mechanism and, on some models, conditioning rolls.

Power to the machine is provided by an engine 12 which is resiliently connected by isolators 122 to the main frame 10 to reduce vibration transmitted into the main frame 10 by the engine 12. The general mode of operation of a modern differential steered agricultural machine is to have tandem hydrostatic pumps 14, 16, one for each of two drive wheels 13, each pump having a depending pintel arm such that forward and reverse movement of the pintel arm relative to a neutral position pivots a swashplate in the associated hydrostatic pump allowing adjustment of the flow rate and flow direction, thus causing the associated drive motor 23 and wheel to rotate. The hydrostatic drive pumps 14, 16 are mounted in tandem directly to the engine 12. Control of the drive pumps from the operator cab 17 is accomplished by operator input from a steering wheel 18 (turning control) and a forward-neutral-reverse (FNR) speed selector 22 operably connected to a drive control mechanism 30 adjacent to the drive pumps 14, 16. A detailed description of a differential steered agricultural machine is provided in U.S. Pat. No. 7,207,581 issued to Osborne, et al., the entirety of which is incorporated herein by reference.

A vehicle autoguidance system 300 is provided comprising an operator interface, a GPS receiver, and computer. The system compares then current position with a desired track and generates one or more steering correction signals representative of steering inputs necessary to steer the vehicle to and maintain its position on the desired track. Such systems generally include an operator interface to allow a machine operator to monitor the autoguidance system, define or memorize a desired track for the machine to follow, make on-the-fly track adjustments to the track, and engage or disengage the system. Most systems will disengage whenever the machine operator makes a manual adjustment, such as turning the steering wheel, to enhance operational safety. The operation of agricultural autoguidance systems is well-known and not discussed in detail beyond the capability of the system to initiate a steering signal indicative of a desired steering input. The present invention receives a steering input signal initiated by an autoguidance system and effects vehicle turning through an interface with a manual, hydraulic steering system on the vehicle. The invention also includes an interface for automatically disengaging the autoguidance control and reverting to manual steering in response to certain operator actions.

Figure 2:
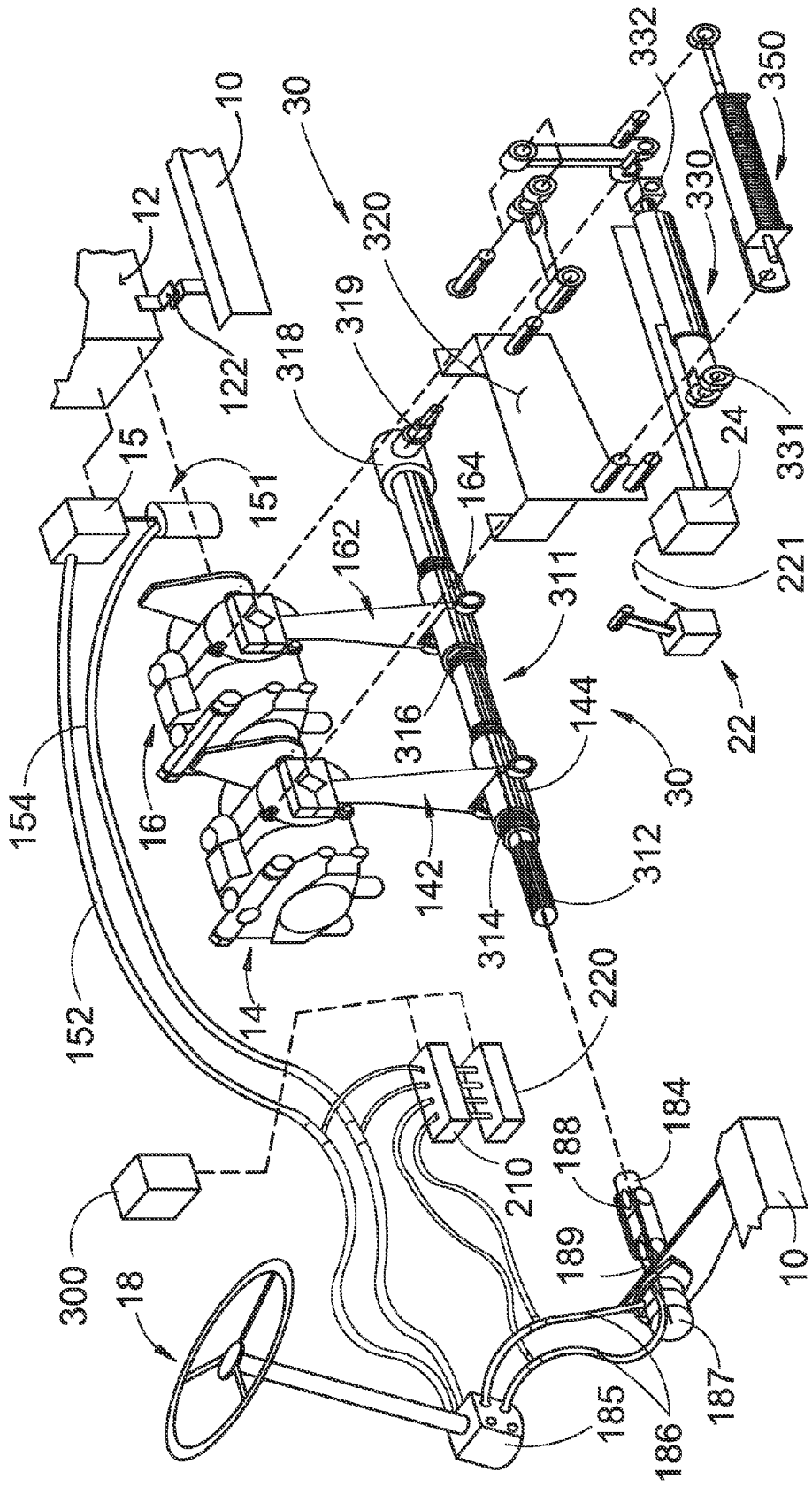
FIG. 2 is a partial left side view of the hydrostatic control system for the windrower of FIG. 1 showing the drive pump control mechanism, mounting, and hydraulic interface.

Referring now to FIGS. 1 and 2, an exemplar hydrostatic control system is shown to include a conventional steering wheel 18 inside the operator's cab 17. The cab would, of course, include additional components (not shown) such as a seat, electrical and mechanical controls for operation of the machine, an air conditioning unit, and the like. The steering wheel 18 is attached to a rotatable steering shaft 182 that is connected to a steering control valve 185 which directs a flow of pressurized hydraulic fluid to a steering drive motor 187. Pressurized hydraulic fluid is provided to the steering control valve by a hydraulic pump 15. As used herein, pump 15 describes the combination of a hydraulic pump, relief valves, connection lines, orifii, and reservoir (tank 151) necessary to provide a specified flow of pressurized fluid to a control device, such as the instant steering control valve, and allow the device to function. An output shaft 189 from the steering drive motor is, in turn, connected to the drive control mechanism 30 by a universal joint 188 and a sliding coupling 184.

The drive control mechanism 30 comprises a control input shaft 311 that engages pintel arms 142, 162 via internally threaded blocks 144, 164 to operably connect the control input shaft to the respective left and right hydrostatic drive pumps 14, 16. The pintel arm blocks 144, 164 engage drive threads 314, 316 on the control input shaft. The drive threads 314, 316 are reversed in relation to each other (one having right-hand thread and the other having left-hand threads) so that rotation of the input shaft 311 causes the blocks 144, 164 to move in opposite directions, either toward one another or away from one another dependent upon the rotation direction of the input shaft 311. This opposing motion in turn causes the pintel arms 142, 162 to rotate in opposite directions, one pintel arm rotating in a clockwise direction and the other rotating in a counter-clockwise direction, when viewed from the side, and alters the displacement of the drive pumps in an opposing manner (e.g., increase output flow in one while decreasing output flow in the other) allowing the machine to be steered by movement of the steering wheel 18. If the machine is in motion, this causes one drive pump to increase flow and the other to decrease flow, turning the machine; however, if the system is already in mechanical neutral, turning the steering wheel 18 increases flow in both pumps, but in opposite directions—the machine turning around itself with one drive wheel 13 going forward and one going in reverse.

Control input shaft 311 is also moveable axially to control the drive pumps 14, 16. The steering drive motor output shaft 189 includes a sliding coupling comprising sleeve 184 and splined end 312 for connecting to the control input shaft 311. The splined interface allows longitudinal movement of the control input shaft 311 relative to the output shaft 189. As the control input shaft is moved axially, the pintel arm blocks 144, 164 are moved forwardly or rearwardly causing the pintel arms 142, 162 to rotate in the same direction (either clockwise or counter-clockwise). Within cab 17 is the FNR lever 22 that is continuously and selectively movable to allow a change in speed of the machine in either the forward or reverse directions. Output 221 from the FNR lever 22 controls a hydraulic valve 24 which causes FNR actuator 330 to extend or retract.

Actuator 330 is connected at first end 332 to a spindle 319 on knuckle 318 which is mounted on control input shaft 311. The knuckle 318 allows rotation of the input shaft 311 while maintaining a fixed axial position on the shaft. An opposing second end 331 of actuator 330 is fixed in relation to the drive pumps 14, 16 by connection to bracket 320. As the actuator 330 is extended or retracted by user-selectable input of the FNR lever 22, the control input shaft 311 is moved forwardly or rearwardly. A stabilizing linkage is provided to guide movement of the knuckle 318 to avoid deflecting the input shaft 311 from its longitudinal axis and further improves movement of the control input shaft 311. A neutral bias element 350 connects between the control input shaft 311 and the bracket 320 to bias the control input shaft 311 into a neutral position, that is one in which the drive pump output flows are essentially zero when the steering control is aligned for straight-ahead travel.

Figure 3:
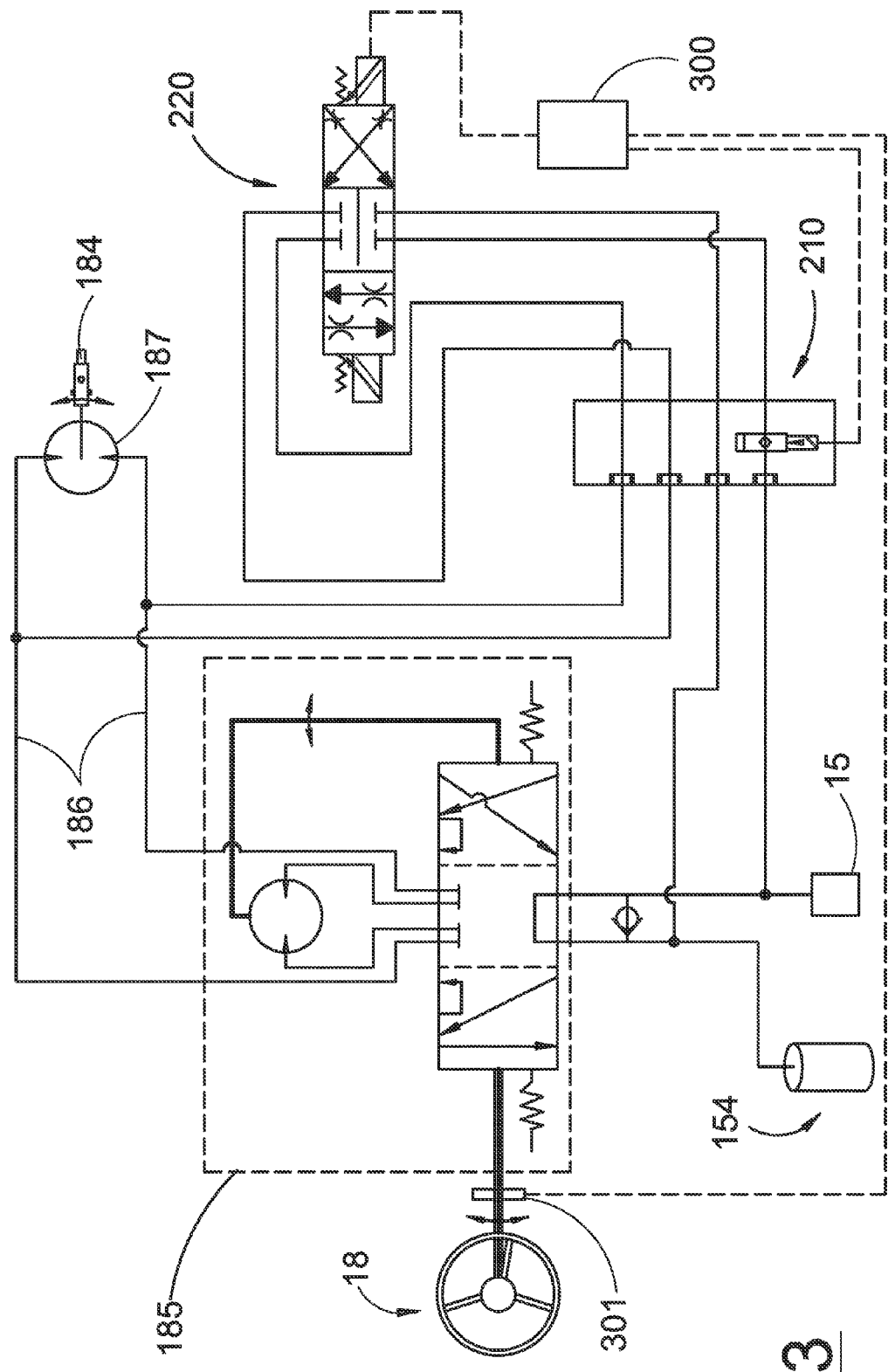
FIG. 3 is a diagram of a first embodiment of the hydraulic steering control circuit with autoguidance interface for the windrower of FIG. 1.

Referring now to FIGS. 2 and 3, rotation of the steering input shaft 30 is accomplished by the steering drive motor 189. The steering drive motor 187 is connected to the main frame 10 and positioned proximate to the steering input shaft 30. An output shaft 189 from the steering drive motor is connected to the drive control mechanism 30 by a universal joint 188 and a sliding coupling 184. The connection allows minor axial misalignment between the steering drive motor 187 and the drive control mechanism 30 without resulting in binding or excessive wear in the motor or the mechanism. A pressurized fluid supply provided by pump 15 via supply line 152 is metered by steering control valve 185 and causes the steering drive motor 187 to rotate, the direction of rotation being dependent upon the rotation of the steering wheel 18. Such valves are well known in the field of differential steered, hydrostatic drive agricultural vehicles. The steering control valve 185 directs pressurized fluid to the steering drive motor 187 via hydraulic lines 186 based on the turning input of steering wheel 18. For example, turning the steering wheel to the right directs pressurized fluid needed to rotate the steering drive motor in the direction necessary to cause right turning of the vehicle. A steady positioning of the wheel 18 (e.g., no directional change necessary) results in no fluid flow being directed to the steering drive motor and thus no movement of the control input shaft; the machine will continue with the same relative drive pump displacements along the same trajectory. Relief flow from the steering control valve 185 is returned to a fluid reservoir (tank) 151 by return line 154. An output shaft 189 from the steering drive motor is connected to the drive control mechanism 30 by a universal joint 188 and a sliding coupling 184.

Selection of the fluid delivery rate from the steering control valve 185 per unit of steering wheel turn input allows the ratio of steering wheel turns to control input shaft revolutions to be varied to achieve desired steering characteristics for the machine. Experience has shown that greater steering precision is achieved by using a relatively small thread pitch for drive threads 314, 316 and pintel arm blocks 144, 164. However, as thread pitch decreases the number of turns of the steering wheel necessary to effect a turn increases. A steering system requiring several complete revolutions of the steering wheel to reverse the course of the machine (e.g., an end of row U-turn) is tiresome for an operator.

An enabling valve 210 and an autoguidance steering valve 220 are hydraulically connected into the steering control circuit to provide a steering interface for the autoguidance system 300. The connection is generally in parallel with the manual steering control valve 185. Enabling valve 210 is a conventional blocking valve that is shiftable between positions to enable or disable the associated hydraulic circuit. When enabled, pressurized hydraulic fluid from pump 15 is directed to the autoguidance steering valve 220. Autoguidance steering control valve is a proportional steering valve, functionally similar to manual steering control valve 185, that is, it receives steering input signals from the autoguidance system 300 and directs a flow of pressurized hydraulic fluid based on the input signal to the steering drive motor 187 to manage the direction of travel of the machine. Hydraulic fluid output from the autoguidance steering valve 220 directed to the steering drive motor 187 rotates the steering input shaft 30 with the same effect as previously described for manual steering. The autoguidance steering valve 220 controls the steering drive motor 187, which is already present on the machine so no additional actuators or mechanical interfaces with the steering input shaft are necessary.

When the enabling valve 210 is shifted to the disabled position, the pressurized fluid supply from pump 15 is blocked, preventing the autoguidance steering control valve from directing pressurized hydraulic fluid to the steering drive motor 187. The manual steering system is unaffected by the presence of the blocked autoguidance interface. A safety disengage feature may be easily incorporated when the vehicle is being steered by autoguidance. The autoguidance system, upon detecting movement of the steering wheel by a steering wheel sensor 301, initiates a signal to shift the enabling valve 210 to the disabled position and isolate the input signal to the autoguidance control valve 220. These steps returns control of the vehicle travel direction to the operator via the steering wheel without any intervening or momentary loss of directional control to enhance operational safety of the machine.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A direction control mechanism for a differential speed steered agricultural machine comprising:
    right and left drive motors;
    right and left hydraulic drive pumps connected in tandem to and driven by an engine, each drive pump having a displacement control mechanism including a pintel arm rotatable between first and second positions, rotation of which changes hydraulic fluid flow rate from respective drive pumps to control speed and direction of respective drive motors;
    a control input shaft connected to the left and right pintel arms, the shaft rotatable about its longitudinal axis and translatable along its longitudinal axis, rotation of the shaft causing simultaneous rotation of the pintel arms in opposite directions, translation of the shaft causing simultaneous rotation of the pintel arms in the same direction;
    a steering drive motor connected to the control input shaft to rotate the shaft thereby managing relative displacement of the right and left hydraulic pumps;
    a steering wheel connected to rotate a hydraulic steering valve to the right and left of a central position, the steering valve directing a volume of pressurized hydraulic fluid dependent upon the degree and direction of steering wheel rotation from the central position to the steering drive motor causing rotation of the control input shaft in proportion to the degree of rotation of the steering wheel;
    an automated steering control apparatus receiving signals from a vehicle guidance system indicative of the degree and magnitude of right and left direction inputs to steer the machine along a predetermined track, the automated steering control apparatus directing a volume of pressurized hydraulic fluid to the steering drive motor, the volume dependent upon the degree and magnitude of the direction change necessary to steer the machine by causing rotation of the control input shaft necessary to achieve the required direction and magnitude of the machine directional change; and
    a selector valve positionable between first and second positions, the first position enabling machine steering by the steering wheel, the second position enabling machine steering by the vehicle guidance system.

2. The mechanism of claim 1, wherein the selector valve position is managed by the vehicle guidance system.

3. The mechanism of claim 2, further comprising a sensor for detecting movement of the steering wheel and communicating a disengagement signal representative thereof to the vehicle guidance system, the vehicle guidance system, upon receipt of the disengagement signal, positioning the selector valve in the first position to enable steering by the steering wheel.

4. A direction control mechanism for an agricultural machine comprising:
    a control input shaft connected to left and right pintel arms controlling the output of right and left hydraulic drive pumps, the input shaft rotatable about its longitudinal axis and translatable along its longitudinal axis, rotation of the shaft causing simultaneous rotation of the pintel arms in opposite directions, translation of the shaft causing simultaneous rotation of the pintel arms in the same direction;
    a steering drive motor connected to the control input shaft to rotate the shaft;
    a first hydraulic steering valve manually rotatable by a steering wheel to the right and left of a central position, the first steering valve directing a varying volume of pressurized hydraulic fluid to the steering drive motor, the variation dependent upon the degree and direction of rotation from the central position, rotation of the first steering valve causing rotation of the steering drive motor and connected control input shaft in proportion to the degree of rotation of the steering wheel;
    a second hydraulic steering valve positionable by a steering signal initiated by a machine autoguidance system, the second steering valve directing a varying volume of pressurized hydraulic fluid to the steering drive motor, the output of the second steering valve causing rotation of the steering drive motor and connected control input shaft in proportion to the steering signal input; and
    a selector valve enabling steering control by the steering wheel or steering control by the machine auto guidance system to be selected.

5. The mechanism of claim 4, wherein the selector valve position is managed by the vehicle guidance system.

6. The mechanism of claim 5, further comprising a sensor for detecting movement of the steering wheel and communicating a disengagement signal representative thereof to the vehicle guidance system, the vehicle guidance system, upon receipt of the disengagement signal, positioning the selector valve to enable steering by the steering wheel.

* * * * *